March 31, 1970     M. SWETLITZ     3,503,323

FOOD COOKING APPARATUS

Filed May 25, 1966     8 Sheets-Sheet 1

Inventor:
Myron Swetlitz
By: [signature] Atty.

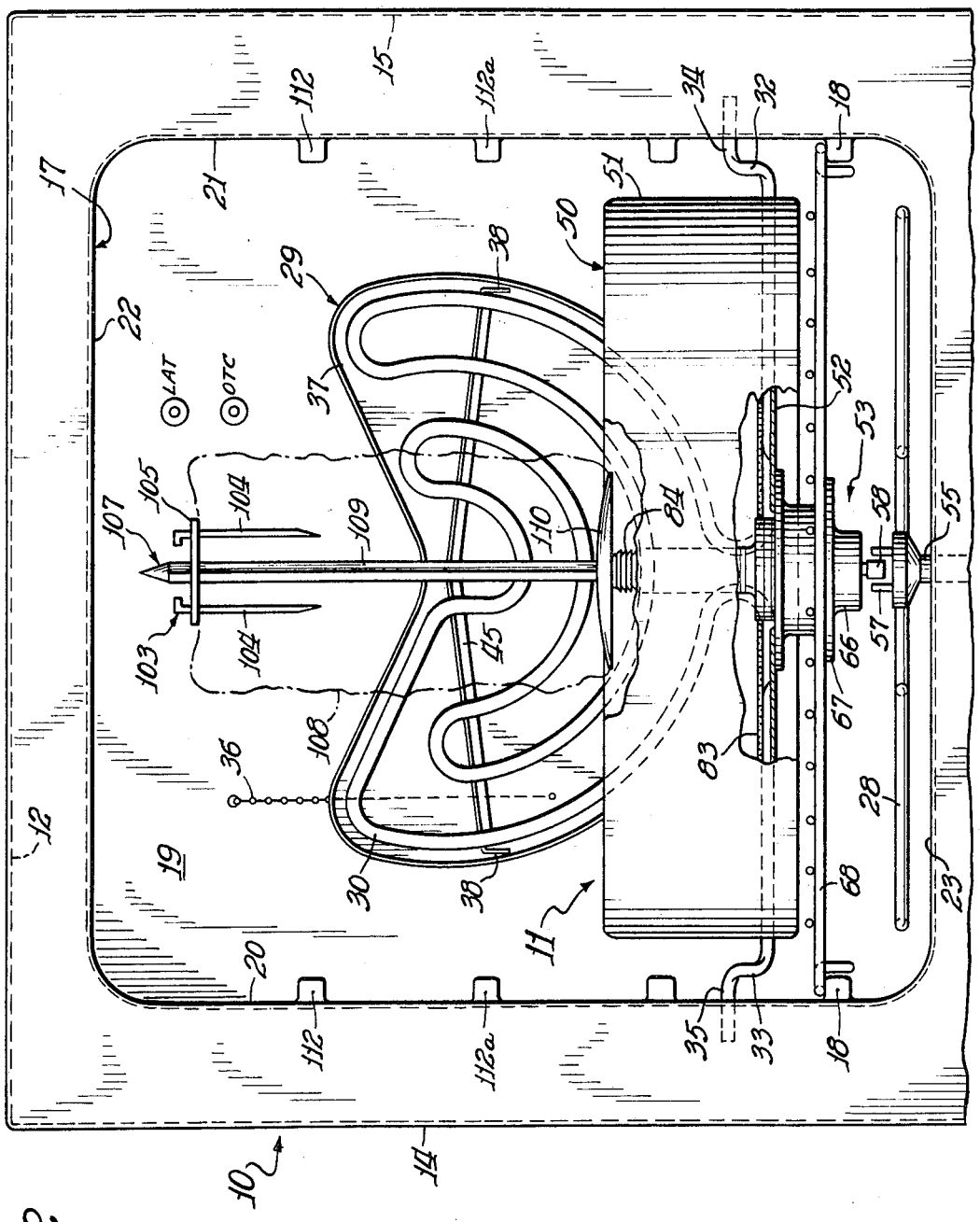

March 31, 1970     M. SWETLITZ     3,503,323
FOOD COOKING APPARATUS
Filed May 25, 1966     8 Sheets-Sheet 3
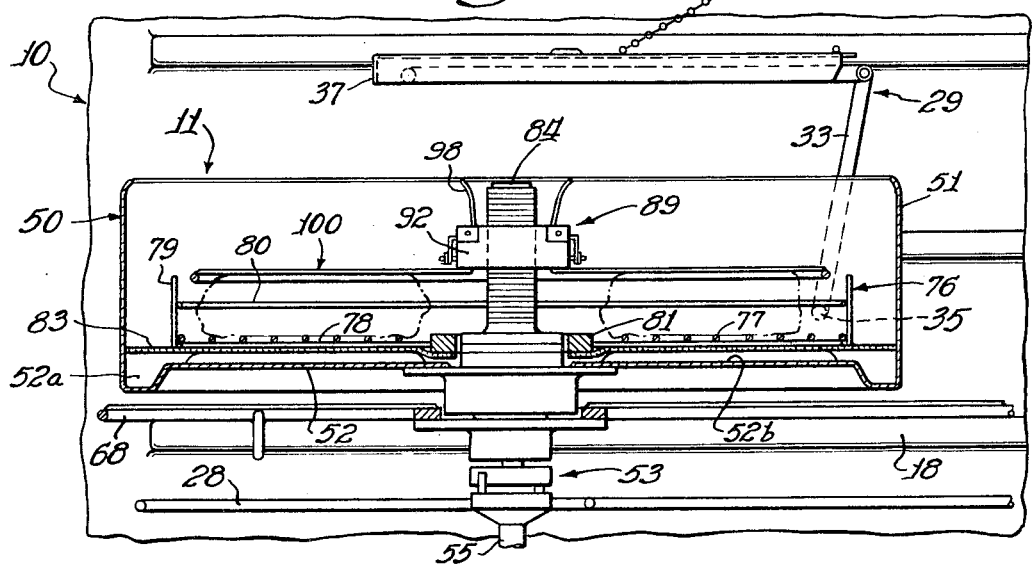
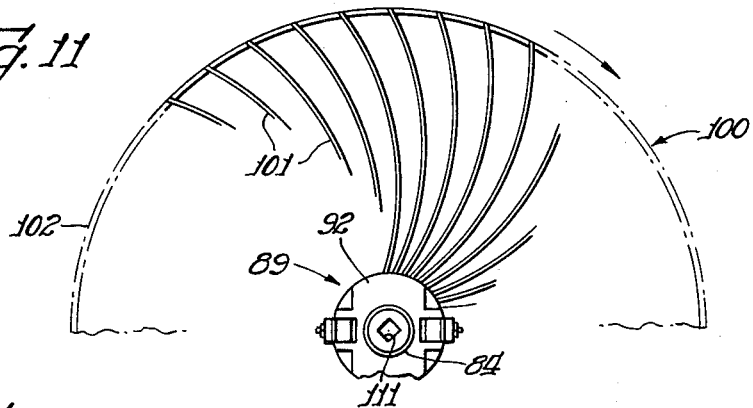
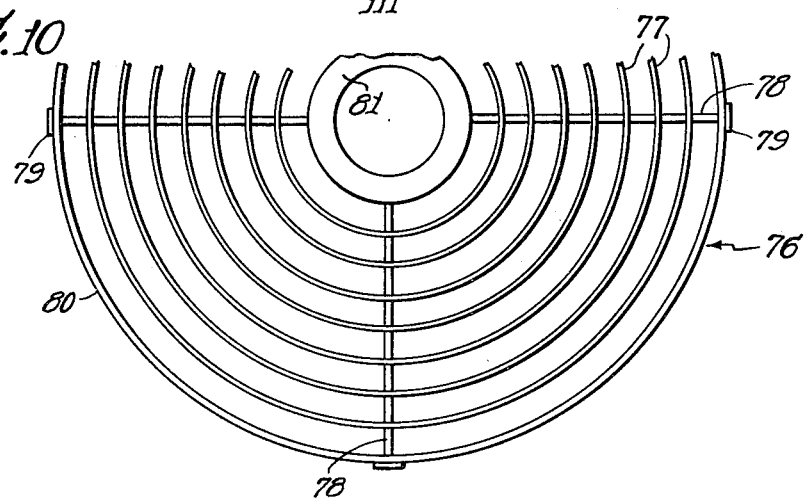

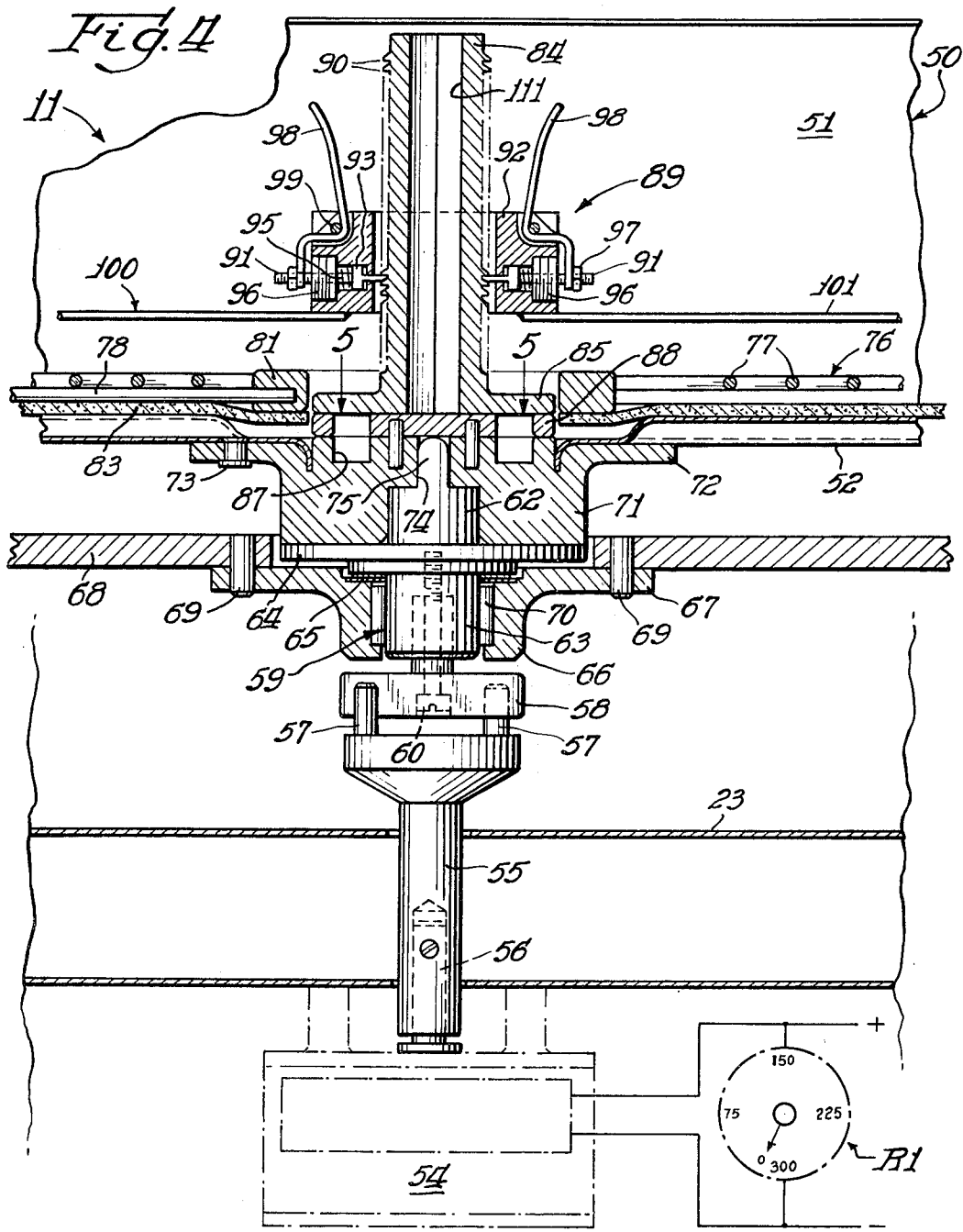

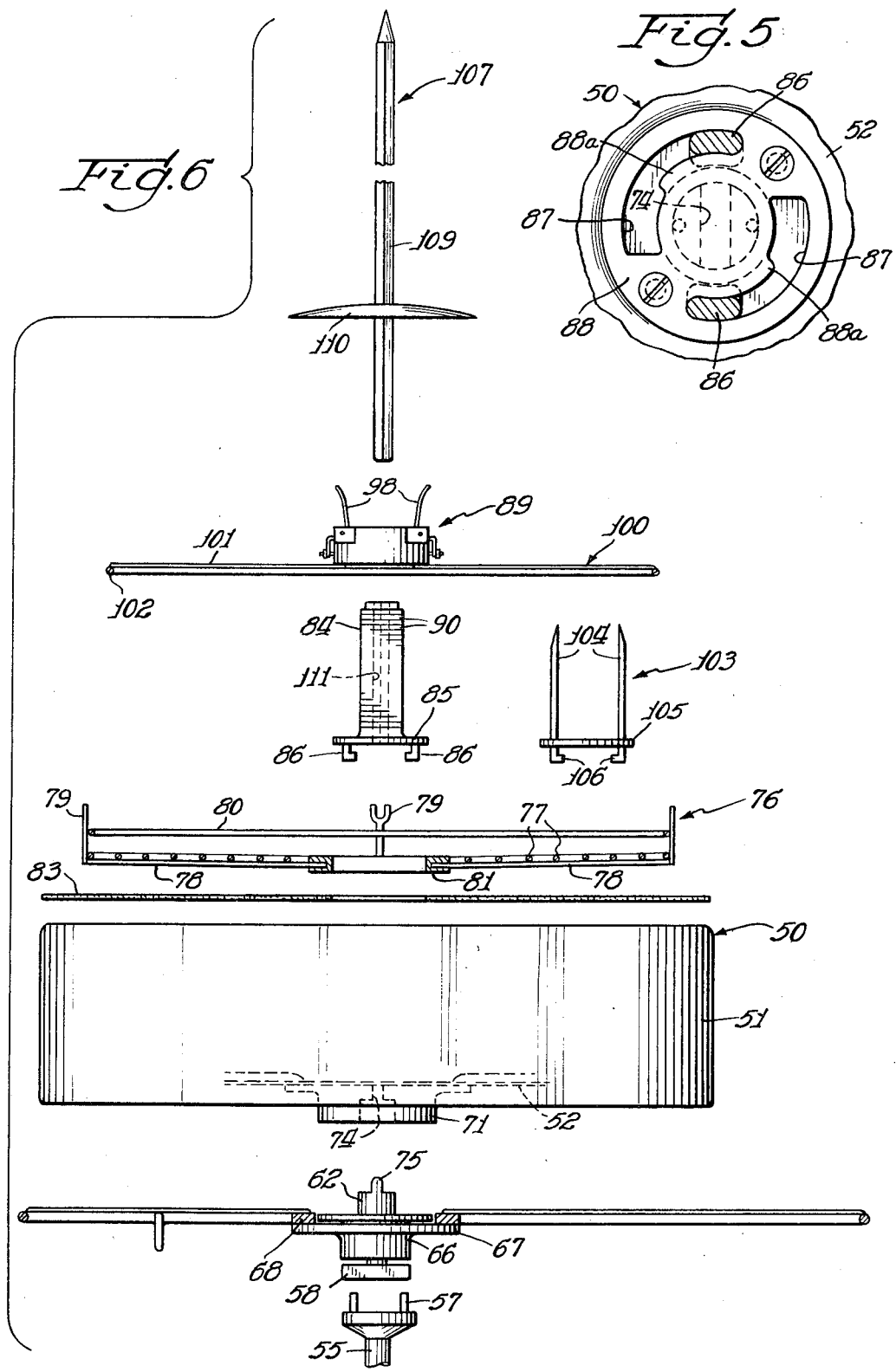

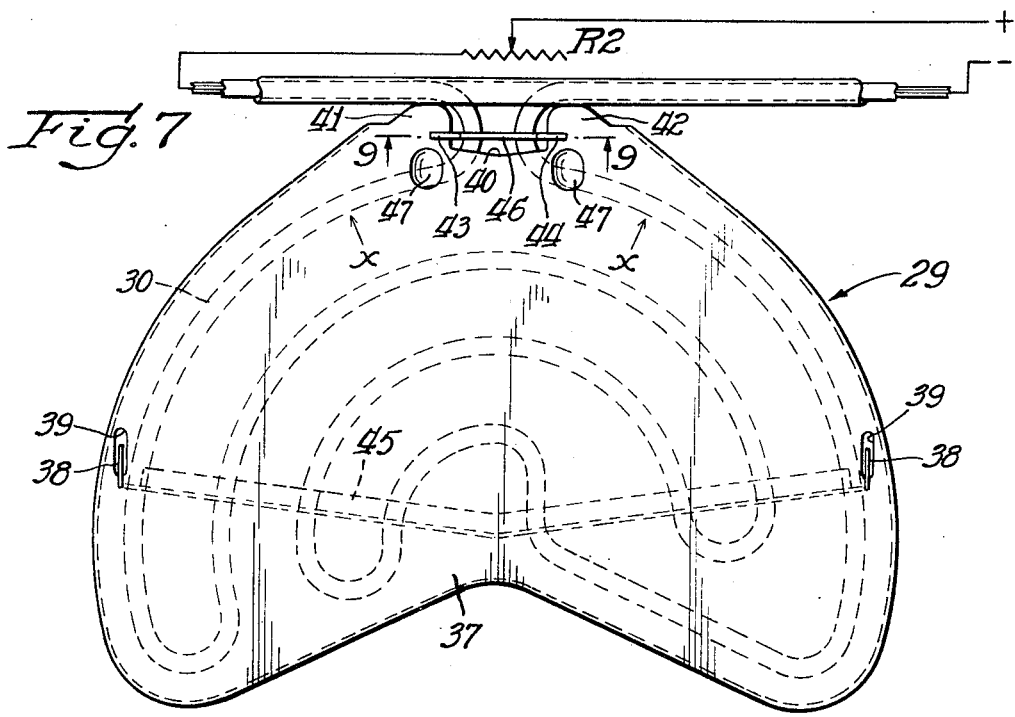
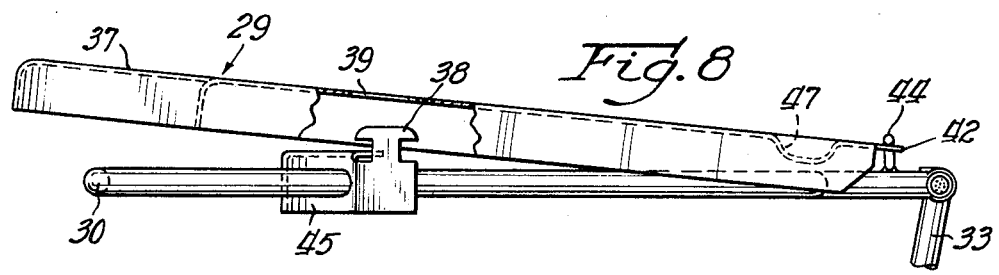
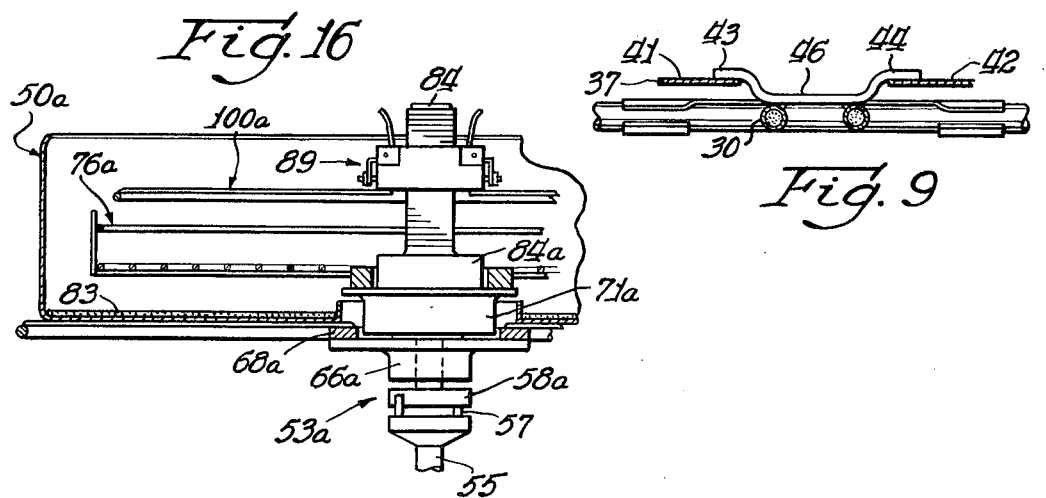

March 31, 1970  M. SWETLITZ  3,503,323
FOOD COOKING APPARATUS

Filed May 25, 1966  8 Sheets-Sheet 7

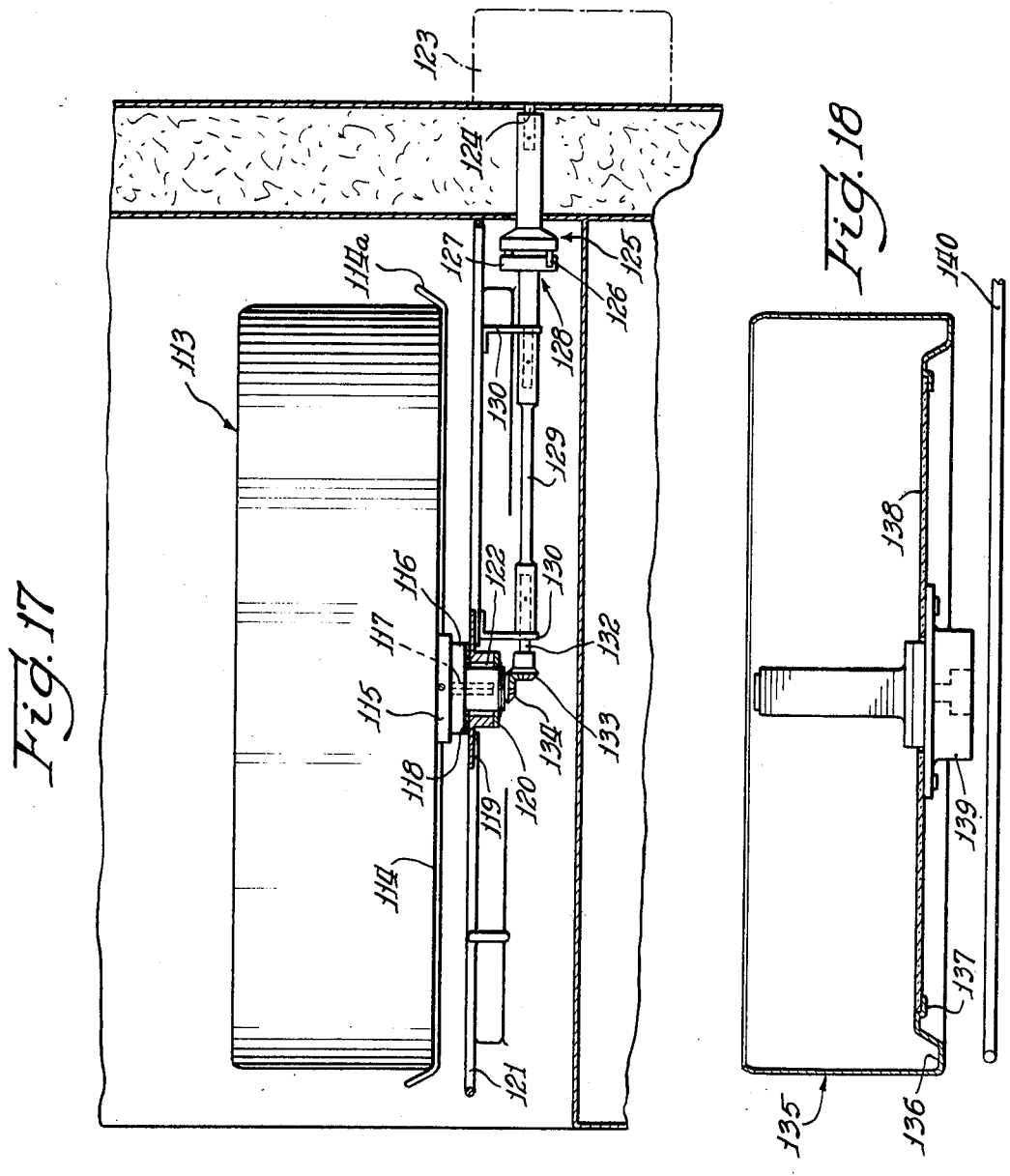

United States Patent Office 3,503,323
Patented Mar. 31, 1970

3,503,323
FOOD COOKING APPARATUS
Myron Swetlitz, Omaha, Nebr., assignor, by mesne assignments, to Fedders Corporation, a corporation of New York
Filed May 25, 1966, Ser. No. 552,948
Int. Cl. A47j 37/04
U.S. Cl. 99—352          13 Claims

ABSTRACT OF THE DISCLOSURE

A cooking apparatus which prevents spatter from reaching and soiling the oven walls. The meat or other food product being cooked is rotated so that the fat and water constituents, which are normally responsible for spatter explosions, are driven from the meat into an underlying container before reaching their explosive temperature. A porous shield is positioned between the meat and the bottom surface of the container such that the fat and water constituents which collect therein after penetrating the shield are protected from further heating.

---

This invention relates to apparatus for cooking foods in a manner to control liquid, emerging from cooking food, from being heated to temperatures conducive to expansion and explosion of the liquid while inhibiting smoke and vapors released in the cooking process.

Conventional oven cooking of foods, particularly meat broiling or roasting, involves the tedious and annoying chore of cleaning burned grease particles and food soil spatters from the oven liner. Spatters occur, for example, by meats heated to cause water exuding from the meat and mingling with the fat vapor and particles on the meat surface to vaporize and explode, with consequent deposition of the fat particles on the hot oven liner to form a dark brown coating tenaciously adhering to the oven liner.

Recent developments have been directed solely to the problem existing in cleaning oven liners, and no known efforts have been taken to prevent or eliminate the source of the problem. One method of cleaning oven liners proposes food particles and grease spatters, striking the hot oven liner and adhering thereto, be removed by pyrolitic action, at exceptionally high temperatures in the oven, the brown and black food soil from the oven liner with the ensuing ashes being thereafter removed from the oven. To safeguard the oven user, it is necessary to provide additional insulation about the oven liner, and also protective devices having fail-safe provisions, to prevent any possibility of physical injury. Furthermore, complicated electrical and mechanical interlocking controls are required to insure proper temperature, timing, and control of the protective devices of this oven cleaning arrangement. It is obvious this arrangement is expensive as reflected in the prices of ranges of this type.

Another current development is to provide the range oven with four or more aluminum or fiberglass cloth sheets or panels with high temperature material to cover the oven liners to collect the food particles and grease spatters, such sheets being separately removable for cleaning and replacement. In such arrangement, it is obvious that the protective sheets require individual and independent placement and removability from special and frequently complicated support means in the oven; manual cleaning of the sheets is necessary and preferably each time of oven use to prevent discoloration; the sheets may be damaged in handling; and, if coated with Teflon or other material permitting ready removal of the food soil, the sheets are still susceptible to damage by marring, stains and temperature limits.

The principal object of the present invention is to provide apparatus for cooking foods in a manner precluding spatter.

Another object of the invention is to provide apparatus for cooking foods in which liquids, in the form of grease and water, emerging from the heated food are quickly removed from the surface of the food into the food container or pan to prevent heating of the liquids to an expansive and explosive degree causing spatter exteriorly of the container and whereby smoke and grease vapors are substantially inhibited.

Another object of the invention is to provide apparatus for oven cooking foods in a manner to prevent spatter and deposition of food soil on the oven liner.

A further object of the invention is to provide apparatus for broiling and roasting meats in an oven in which the grease and water, emerging from the heated meat, is constantly drained from the surface of the meat to prevent heating of the grease and water to a degree causing explosions and spatter on the oven liner.

A specific object of the invention is to provide apparatus for cooking in which meats are heated to broiling and/or roasting temperatures with consequent exuding of grease and water from the meat, and concurrently removing the exuded grease and water from the surface of the meat by centrifugal force imparted by rotation of the meat thereby preventing heating of the normally-present water-grease mixture on the meat surface to a degree causing expansion and explosion of the water into vapor with attendant spatter and deposit of the grease on the oven liner and undesirable smoke and grease vapor.

In practicing the present invention, apparatus, in one form of the invention, comprises a food container or pan having a cylindrical side wall and a bottom wall; means for rotating the pan to effect the flow of grease and/or water from the surface of the meat by centrifugal force to the pan side wall for containment and shielding from heat radiation; a shield positioned on and heat-insulating the bottom wall of the pan, the shield being formed of porous material effective to permit drainage of the grease and/or water to the pan side wall during rotation; temperature controls; and pan-rotation speed controls.

The invention will be better understood from the following description taken in conjunction with the accompanying drawings in which:

FIG. 2 is a front elevational view of the oven and apparatus shown in FIG. 1, with the oven door removed and the apparatus having a different fixture for meat roasting;

FIG. 3 is a vertical sectional view of the oven and apparatus shown in FIG. 1, with the apparatus having a fixture for meat broiling;

FIG. 4 is a vertical sectional view of the oven and apparatus illustrating the details of the drive mechanism for rotating the pan, and another fixture for meat broiling;

FIG. 5 is a horizontal sectional view, taken on line 5—5 of FIG. 4;

FIG. 6 is an exploded view of the apparatus shown in FIGS. 2 and 4;

FIGS. 7 and 8 are top and side elevations of the heater and reflector assembly of the apparatus shown in FIGS. 1, 2, 3, and 4.

FIG. 9 is a sectional view of the heater and reflector assembly of FIGS. 7 and 8, the section being taken on line 9—9 of FIG. 7;

FIG. 10 is a top view of the meat-holding grid of the apparatus;

FIG. 11 is a partial top view of the rack for retaining steaks, and the like, on the rack of FIG. 10;

FIG. 16 is a vertical sectional view of a modification of the pan and meat-carrying grid and rack assembly in which the pan is stationary and the grid and rack assembly rotate;

FIG. 17 is a vertical sectional view of a modification of the pan-rotating drive mechanism; and FIG. 18 is a vertical sectional view of another modification of the pan in which a heat-conducting vitreous plate forms the bottom of the pan.

Figure 1:
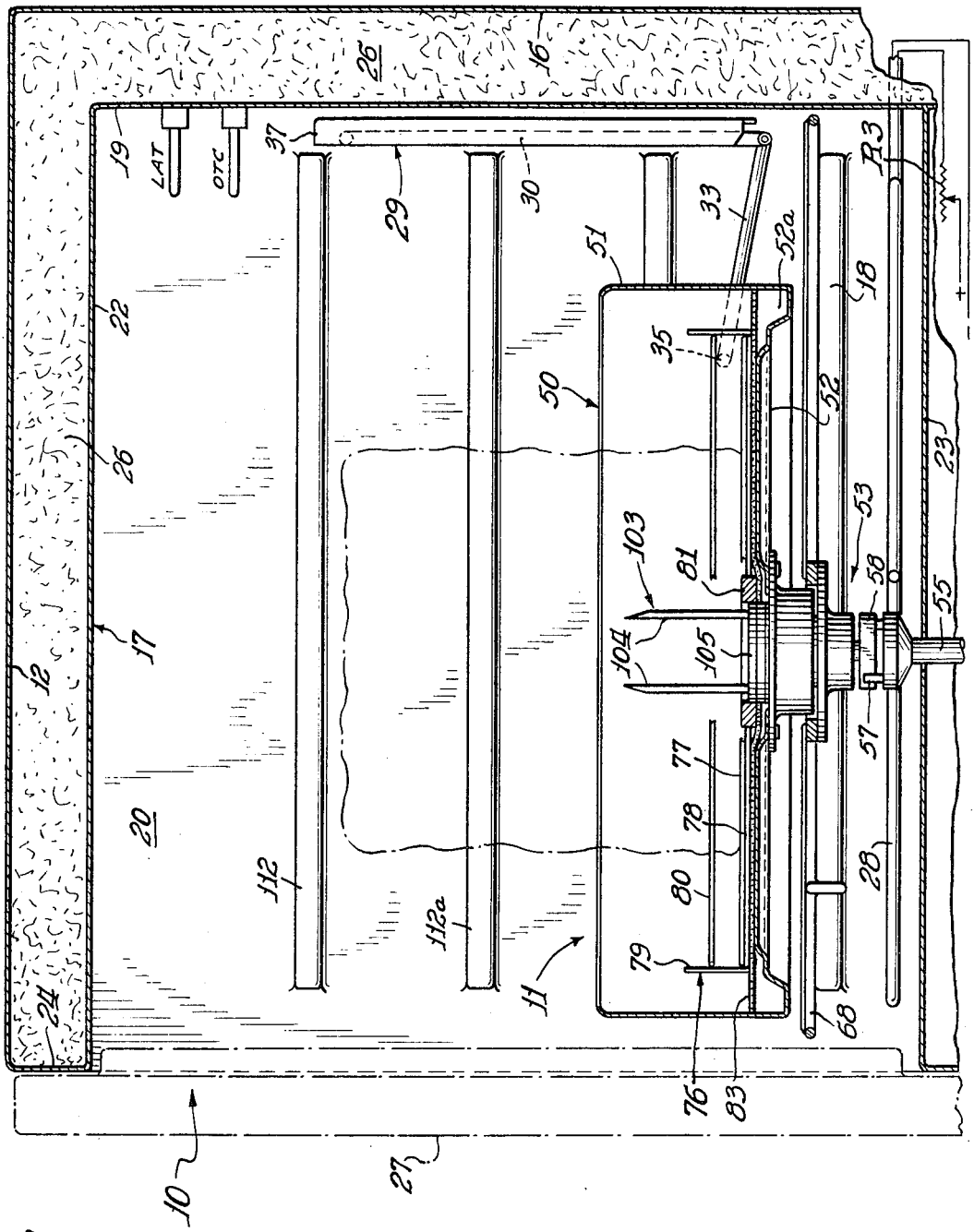
FIG. 1 is a vertical sectional view, from front to rear, of an oven embodying apparatus of the present invention the apparatus including a rotatable pan and having a fixture for meat roasting.

Referring now to FIGS. 1, 2, and 4 of the drawings, there is shown a range oven 10 containing apparatus 11 embodying features of the present invention and by which the method of the present invention may be practiced. More particularly, the body of the oven 10 comprises a top panel 12, side panels 14 and 15, and a rear panel 16 housing a substantially box-shaped metal liner 17 providing an oven cooking cavity therein. The liner 17 comprises a rear wall 19, side walls 20 and 21, and top and bottom walls 22 and 23. The oven body also includes a front panel 24 providing a front opening aligned with a front opening in the oven liner to permit access to the oven cavity, suitable heat insulating breaker structure 25 being provided therebetween. The liner walls are in spaced relation to the oven body panels for disposition of fiberglass batts 26 compressed therebetween for heat insulation of the liner. The aligned front openings of the oven body and liner are closed by a conventional oven door 27 pivotally connected and movable about the lower edge of the oven body by hinge structure (not shown) between a vertical closed position and a horizontal open position with respect to the open front of the oven cavity.

An electric heating unit 29 is mounted in the side walls 20 and 21 of the oven liner for pivotal movement about a horizontal axis between a horizontal broiling position shown in FIG. 3 and a vertical roasting position shown in FIGS. 1 and 2. More particularly, the heating unit 29 comprises an electric heating element 30 of the tubular metallic sheathed type in which the sheath encloses an electrical coil wire resistance heater and is mineral packed for insulating the coil from its sheath. The heating element is convoluted to be of fan-shape form, as seen in FIGS. 2 and 7, with the ends of the resistance wire terminating, at X—X in FIG. 7, in the sheath and connected to electrical conductors in the sheath and which conductors extend through the sheath and oven liner walls 20 and 21 for suitable connection to current supply conductors and the fan-shaped convolutions of heating element 20 are disposed in a common plane and its ends are formed to provide downwardly extending parallel legs 32 and 33 (FIGS. 3 and 8) disposed to extend beneath the convolutions at an acute angle and having their lower ends merging with aligned oppositely extending terminal portions 34 and 35 extending into the oven side walls 20 and 21 and providing pivots for movement between horizontal and vertical positions. In this pivotal mounting of the heating unit 29, it will be seen the angular disposition of the legs 32 and 33, relative to the fan-shaped convolutions and pivots 34 and 35, causes the center of gravity of the heating unit to be behind the pivots 34 and 35 so that when the heating unit 29 is moved from its horizontal position of FIG. 3 toward the rear wall of the oven liner, the heating unit 29 will remain in its vertical position. The unit 29 is held in its horizontal position by the provision of a bead chain 36 (FIG. 3) extending between and connected to the rear wall of the oven liner and to a reflector 37 secured to the heating unit 29.

The reflector 37 is positioned above the heating unit 29 (FIG. 3) and is fan-shaped to overlie and conform to the shape of the heating convolutions thereof. The reflector is supported on a V-shaped bracket 45 having spaced U-shaped openings through which the convolutions of the heating unit extend, the ends of the bracket being provided with upstanding T-shaped lugs 38 (FIG. 8) received within slots 39 in the reflector, as in FIGS. 7 and 8. The rear portion of the reflector is formed with a channel 40 defining spaced tangs 41, 42 underlying the spaced end portions 43, 44 of a U-shaped retainer having its body 46 welded to converging rear portions of the convolutions of the heating element. The reflector can be pivoted about the retainer relative to the heating element. The reflector is spaced from the heater element by the bracket 45 in cooperation with downwardly extending bosses 47 of the reflector engaging the heater element. In assembly of the heater element and reflector, the tangs 41, 42 of the reflector are positioned beneath the end portions 43, 44 of the retainer 46 and pivoted downwardly by bosses 47 to position the lugs 38 of the bracket 45 in the openings 39 in the reflector, the reflector then being moved rearwardly of the heating element so that reflector portions defining the slots 39, enter the front slots of the lugs.

Figure 12:
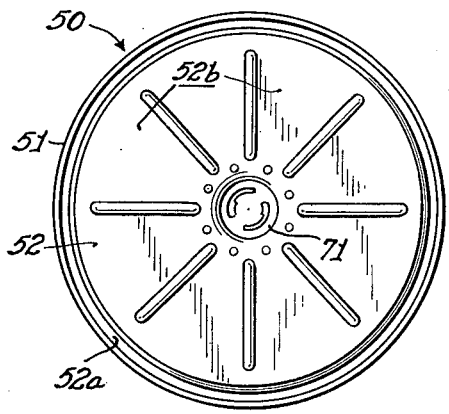
FIG. 12 is a top plan view of the meat-containing pan.

Apparatus of the present invention, for practicing the method of the invention, comprises an aluminum or chromium-plated steel food container or pan 50 having a cylindrical side wall 51 and a bottom wall 52 defining, at its juncture with the wall 51, an annular groove providing a well 52a. As seen in FIGS. 1 and 12, the bottom wall 52 of the pan is formed with radially extending channels 52b communicating with the well 52a. The interior surface of the side and bottom walls of the pan are coated with a high temperature plastic such as polytetrafluoroethylene available on the market under the Du Pont registered trademark Teflon. The pan is rotatable by a drive mechanism 53 connected to an electric motor 54 fixed to a stationary panel of the oven. Referring to FIG. 4, the drive mechanism comprises a drive shaft 55 coupled to the motor shaft 56 and having its upper end provided with axially spaced pins 57 receiving therebetween an elongate lug 58 connected to and depending from a driven shaft 59 by a bolt 60. The driven shaft 59 comprises an upper key portion 62 and a lower hub portion 63 and a central radially extending flange 64 positioned and engaging washers 65 of heat-insulating material received within a recess in an annular support member 66 having a radially extending flange 67 connected to an oven shelf 68 by rivets 69. A plurality of roller bearings 70 are received within an annular recess in the inner cylindrical surface of the support member and engage the cylindrical outer surface of the hub portion 63 of the driven shaft 59.

The pan is connected to the driven shaft 59 by a hub 71 supported on the flange 64 of the driven shaft and coupled to the key portion 62 of the driven shaft. More particularly, the hub 71 extends upwardly through a central opening in pan 50 and is provided with a flange 72 engaging the pan bottom and connected thereto by rivets 73. The driven shaft has its upper key portion 62 received in an axial opening in hub 71, the top of the opening defining a slot 74 receiving the elongate head 75 of the key portion to drivingly couple the pan to the driven shaft. It will be seen from FIGS. 2 and 4 that the described pan and drive mechanism is supported on an oven shelf slidable into and out of the oven on horizontally aligned bosses 18 of the oven side walls by means of the releasable coupling connection of the pins 57 of the drive shaft and lugs 58 of the driven shaft.

The pan 50 is provided with a grid support 76 for meats and is shown in FIGS. 3, 6, and 11 as being formed of a plurality of wire rings 77 arranged concentrically and welded to diametrically extending spacer wires 78 with vertical short wires 79 spaced circumferentially of the radially outer ring 77 and welded thereto and also to a guard ring 80. The center of the grid is defined by a collar 81 having circumferentially spaced radial passages receiving the inner ends of the spacer wires 78. The support 76 has its collar 81 connectible to various devices for holding different shapes of meats for broiling and roasting as will presently be described.

Disposed between the bottom of the grid support 76 and the bottom wall of the pan is a thin plate 83 formed of a rigid porous material, such as open-pore ester-type polyurethane foam available on the market under the Scott Paper Company registered trademark "Scott," and having the characteristics of an open mesh-like skeletal structure containing a high percentage of void space so that the material is extremely porous and permeable and has low resistance to fluid flow. As seen in FIG. 1, the plate 83 covers the entire area of the upper surface of the bottom wall of the pan, the peripheral edge of the plate abutting the cylindrical side wall of the pan. The purpose and function of the plate 83 will be later described.

In practicing the preferred embodiment of the invention, all of the above described apparatus is utilized, additional and different devices being provided for retention of meats of different shapes for roasting and broiling.

Referring to FIGS. 4, 5, and 6, the apparatus is shown in condition to perform a meat-broiling function and in which a cone 84 has a base flange 85 received within the collar 81 of the grid support 76 and provided with downwardly extending spaced L-shaped tangs 86 received within slots 87 (FIG. 5) in the top of hub 71 so that, upon rotation of the cone 84, the foot portions of the tangs will be moved into engagement with ledges 88a of a washer 88 to securely lock the cone 84 to the hub 71 for rotation therewith and the pan 50.

The cone 84 cooperates with a rack assembly 89 functioning to engage and insure retention of meat, such as steaks, on the grid assembly 76 during rotation thereof during broiling. The cone 84 has its outer surface provided with singular ribs 90, spaced axially of the cone, for receiving the ends of rods 91 extending through aligned openings in a collar 92. The rods 91 have enlarged piston-like portions 93 receivable within chambers in the collar 92, aligned with the openings, and adapted to urge the pins toward the cone 84 by springs 95 positioned between the portions 93 and plugs 96 threaded into the collar 92. The rods 91 extend through and are slidable in the plugs 96 and have their outwardly extending threaded ends provided with nuts 97. The inner ends of the rods 91 are retractable from the cone by finger-pieces 98 rotatable about pivot pins 99 anchored in collar 92 to engage the nuts 97 to effect movement of rods 90 for this purpose. The nuts 97 also function to permit adjustment of the finger pieces 98 for operating the rods 91. The collar 92 is provided with a wire rack 100 having a plurality of arcuate wires 101 (FIG. 11) converging toward the collar 92 and having its radially inner ends secured, as by welding, to the collar 92 and its radially outer ends connected to a wire ring 102. It will be apparent that the rack assembly 89 may be moved vertically to have its rack 100 engage different thicknesses of meats, such as steaks, on the grid 76 so that the steaks are firmly held between the grid assembly 89 and grid 76 during rotation of the pan 50 in a broiling operation.

Referring to FIG. 1, the apparatus is shown in its application to roasting meat, indicated as a rolled beef roast. To securely hold the meat on the grid support 76 centrally of the pan during rotation of the pan, the roast is positioned on the holder 103 having tines 104 of a forked mounting cap 105 centrally of the roast. The cap 105 is adapted to be drivably connected to the hub 71 by tangs 106 (FIG. 6) in the same manner as previously described with reference to the cone 84.

Referring to FIGS. 2 and 6, a meat-holding device or spit 107 is illustrated for rotisserie-broiling meat, (identified hereinafter as "Roto-Broil") for example, fowl or a large rolled beef 108, by the cooking apparatus, To insure retention of the meat, the device includes a skewer 109 extending through the meat and having an umbrella-like support 110 for engaging the bottom of the meat to hold the meat in position relative to the pan 50 and heating coil assembly 29, as shown. The skewer 109 has a square cross-section, and its lower end is received within a complementary passage 111 in the cone 84. Positioned on the skewer 109, adjacent the top thereof, is the previously-described holder 103, the holder being shown inverted with its tines 104 positioned in the meat. The holder 103 has its cap 105 provided with a square opening to receive and couple the skewer 109 for rotation therewith.

Considering now the application of the described novel apparatus in practicing the new method of spatterless cooking, the general principle is directed to the prevention or avoidance of the normal presence of liquids in the form of water and/or grease, emitted from heated foods such as meats, remaining on the foods for such length of time as to cause the liquids to expand and vaporize by heat to produce explosions providing spatter exteriorly of the pan and, in the case of ovens, on the hot oven walls providing charred food soils thereon exceedingly difficult to remove or clean, as well as smoke from burning of the spatter. In practicing this method, the apparatus has been particularly designed to quickly remove or drain the fluids, emerging from the heated food, into the container or pan to prevent heating of the fluids to an expansive and explosive degree causing spatter exteriorly of the pan. More particularly, the apparatus includes, in the preferred embodiment thereof, means for rotation of the pan to effect removal of the fluids from the surface of the foods by centrifugal force concurrently with cooking of the foods; shielding of the heat from liquid-collecting portions of the pan; temperature controls; and pan-rotation speed controls.

In the various meat-cooking operations by the described apparatus in the performance of the method of the invention, principal components of the apparatus include the pan 11 and its rotative mechanism; means for controlling the speed of rotation of the pan in the form of a rheostat R1 (FIG. 4); the porous shield 83 situated on and covering the entire area of the bottom wall of the pan; the heating assembly 29; heating element 28; a conventional oven thermostat OTC (FIG. 1) controlling wattage for uniform heating; a conventional low amplitude thermostat LAT (FIG. 1) of ±10° for controlling wattage surges; a wattage input control for the heating elements 28 and 29 in the form of rheostats R2 and 3 (FIGS. 1 and 7); the described meat holders to retain the meats in desired positions during rotation thereof. A low amplitude thermostat may be of the type disclosed in U.S. Patent 2,962,575.

In explaining the functions of these components, it is critical in precluding spatter that the water and grease, exuded on the meat surface, be promptly removed from the meat surface to prevent heating of the water and grease mixture to an extent the water and grease mixture expands and explodes creating spatter. The rotation of the pan is effective to drain this mixture by causing flow of the mixture by centrifugal force from the meat downwardly into the pan so that excessive heating to the explosive point is avoided. It is equally important that the drained grease and water mixture does not contact highly heated metal areas of the pan, such as the bottom wall of a pan in conventional cooking, as contact will cause the mixture to expand and explode to dispense spatter exteriorly of the pan. In the present apparatus, the shield 83 is positioned and serves as an effective heat barrier to prevent such heating of the pan bottom wall. In addition, due to its porous character, the shield does not absorb or retain the grease and water mixture, but permits the mixture to freely flow therethrough and along the bottom wall of the pan toward the collecting well 52 of the pan (which may also be covered by the shield) so that this constant flow of the mixture prevents heating of the mixture to an explosive degree, when the heat source is above the meat. During a bake operation, when the heat source is below the pan, the shield 83 is effective to prevent spatter from going out of the pan. The provision of the conventional oven temperature thermostatic control provides the proper cooking temperature by heater wattage control, while having, in the case of a low amplitude thermostatic feature (such as shown in U.S. Patent 2,962,575) insures, by its ±10° F. setting, the prevention of power wattage surges which may cause undesired fluctuating high temperatures of the heating elements and thereby explosions of the mixture on the meat surface before expulsion therefrom by centrifugal force.

The following table illustrates succinctly, but not necessarily exclusively, changes made in the conventional cooking procedures in using the apparatus of the present invention:

|  | Bake | Roast | Broil | Roto-Broil |
|---|---|---|---|---|
| Changing to a low amplitude thermostat | X | X |  | X |
| Adding a porous shield (similar to Scott-foam between the meat and pan bottom |  | X | X | X |
| Change roasting temperature to 275° and rotisssing temperature to 275° F |  | X |  | X |
| No change in roasting and rotisssing time |  | X |  | X |
| Changed the rotisserie horizontal rotation to vertical rotation |  |  |  | X |
| Changed broiling from a static to a dynamic operation by rotating the meat at 70 r.p.m |  |  | X | X |
| Changed shape of broil pan |  |  | X | X |
| Changed location of broil element to back wall of oven |  |  | X | X |
| Change roasting from a static to a dynamic operation by rotating the meat at 70 r.p.m |  | X |  |  |
| Low power (wattage) |  | X | X | X |

An understanding of the apparatus of the present invention may be more clearly apparent by an explanation of specific examples of developments conducted to establish the above-described phenomena.

Referring first to FIG. 3, the grid support 76 contains steaks, one inch in thickness, and held firmly on the support by the rack assembly 89, and the heater assembly 29 is in a horizontal position over the steaks and one and one-half inches (1½) from the top of the pan. The pan has a diameter of fourteen and one-half (14½) inches and its height is four inches. For the broil operation, the oven thermostat OTC is set to provide 1700 watts input to the heating assembly. The speed of rotation of the pan is 70 r.p.m. The oven door is partially open to the position provided in conventional broiling. The low amplitude thermostat LAT is ineffective. Cooking time for the initially broiled side of the steaks was 10 minutes and for the other side of the steaks was 6 minutes to provide a medium-rare condition of the steaks. On the conclusion of this broiling operation, no spatter, from the meat or pan, could be observed on the oven liner walls.

During this broiling operation, water and liquid grease exudes from the steaks and, due to rotation of the pan and thereby the steaks, is quickly removed by centrifugal force toward the periphery of the grid assembly 86 and flows downwardly to the shield 83, which, in addition to insulating the bottom wall of the pan from the radiant energy of the heater element, serves, due to its porous material, to the collector well 52a of the pan. It will be noted the surface of the pan bottom wall and the grooves therein to the collector well 52a of the pan. It will be noted the arcuate wires 101 of the rack 100 and rotation of the rack in the direction indicated in FIG. 11, is instrumental in facilitating flow of the mixture toward the side wall of the pan.

Equally spatterless broiling of bacon has been proven in tests. In bacon broiling, grease exudes in considerable quantities. As a general condition, the greater the amount of grease, exuding from meat, requires proportionally greater rotational speeds to satisfactorily remove the grease from the meat. Accordingly, a rotational speed of 260 r.p.m. may be required in bacon broiling for this purpose.

Further broiling experiments indicated the speed of rotation of the pan directly influences cooking time (time to doneness) of the steaks. As the rotational speed increases, the cooking time decreases. Above 70 r.p.m. to 300 r.p.m., the meat requires a hold-down fixture 89 to prevent movement to the side wall of the pan. Above 300 r.p.m., confinement of the meat becomes very critical because of the cohesive strength of the meat being disrupted to an extent the meat tends to tear itself apart. It has been determined rotational speeds of the pan, providing spatterless cooking, is in the range of 30 r.p.m. to 300 r.p.m. In addition, it has been observed increases in wattage input to the heater requires increases in the rotational speeds (r.p.m.) of the pan to insure more rapid draining of the grease-water mixture from the meat to prevent spatter.

Figure 13:
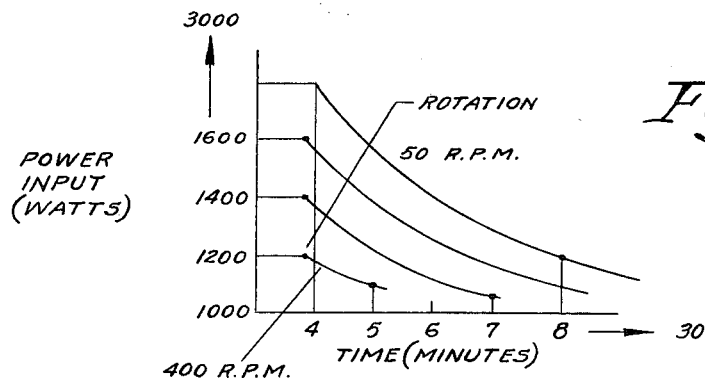
FIG. 13 is a graph illustrating the wattage-rotational speed relationship involved in broiling meats by the method and apparatus of the invention.

FIG. 13 is a graphic illustration of the time-wattage-rotational speed relationship involved in broiling meats in accordance with the described example of the present method.

Figure 15:
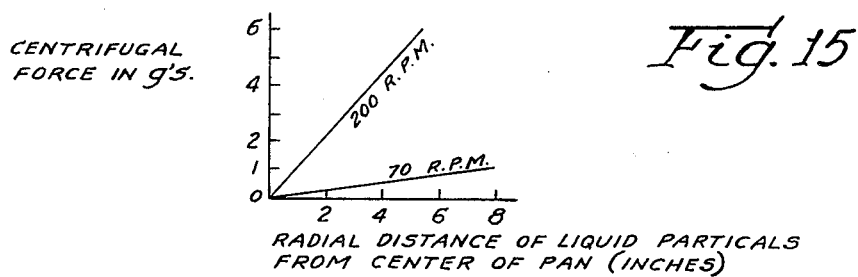
FIG. 15 is a graph illustrating the effect of centrifugal force on liquid particles spaced different distances from center of the broiler pan.

FIG. 15 is a chart illustrating, for a given speed of operation, the centrifugal force acting on the liquid particles increases in proportion to the distance of the particles from the axis of rotation of the pan. It is also obvious considerable forces can be generated at moderate speeds.

Referring to FIG. 1, illustrating a roasting operation, meat, in the form of a roast, is positioned on the grid assembly 76 in the pan, and the heating element 28 is only effective to heating of the roast. As an illustrative specific example, the round roast weight is four pounds and ten inches in diameter and is spaced two inches from the side wall of the pan. The pan is 15 inches in diameter and 3 inches high. The oven temperature is 275° F. and rotational speed of the pan is 70 r.p.m. A low amplitude thermostat controls the oven temperature ±10° F. (or lower). Cooking time was two hours. At the termination of the roast operation, no spatter from the meat or pan was observable on the oven liner walls.

In the roasting operation, water and liquified grease exudes from the meat and forms a mixture on the meat surface and is caused, by rotation of the meat and pan, to continuously flow from the top surface of the roast to mingle with the mixture on the rounded side surface of the roast and onto the shield 83 for movement, by centrifugal force, along the bottom wall of the pan into the well 52a of the pan. While the rotational speed of the pan is insufficient to fling the mixture from the meat toward the side wall of the pan, such possibility, occurring at higher rotational speeds, would be confined by the pan side wall to prevent spatter exteriorly of the pan.

Figure 14:
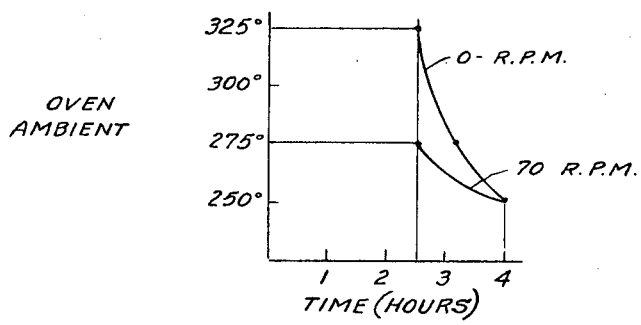
FIG. 14 is a graph illustrating a time-temperature-rotational speed relationship.

In experiments, it has been determined spatter from the meat surface is a direct function of the oven ambient temperature (thermostat setting), i.e., the higher the oven temperature, the greater possibility exists of spatter occurring. It has been found rotation of the pan and meat improves heat transfer from the oven air to the meat so that, at 70 r.p.m. and 275° F. oven temperature, satisfactory roasting of the meat can be achieved in the same time required to do an identical stationary roast in an oven ambient of 325° F., as shown graphically in the oven temperature-time-rotational speed relationship of FIG. 14. Another determined factor is that spatter from the meat surface is also a direct function of thermostat amplitude so that control by a low amplitude thermostat to confine oven temperature changes to ±10° F. (or lower) at 350° F. (normal setting) is valuable. The shield 83 is effective to prevent spatter at all oven temperature settings because of the temperature distribution afforded by the location of the bottom heating element 28. Roasting time (time to doneness) is a function of oven ambient temperature and rotational speed (r.p.m.) of the meat, i.e., roasting time decreases as oven ambient increases but spatter occurs, while increasing rotational speed causes decrease in roasting time with spatter decreasing. At 70 r.p.m., centrifugal force is insufficient to sling meat juices from the pan under the specific exemplary conditions described. Above 300 r.p.m., the meat juices will leave the pan area if the roast is higher than the pan; a mechanical device is required to hold down and retain the meat in its initial position; and the meat tissues separate or tear to disintegrate the meat. A suitable and satisfactory range of rotational speeds for meat roasts has been found to be between 30 r.p.m. to 130 r.p.m.

With reference to the rotisserie-broiling of meats, attention is directed to FIG. 2 in which a large rolled beef 108 is positioned on the support 110 with the skewer 109 extending through the meat and with the tines of the holder 103 inserted into the meat, to firmly support and contain the meat during rotation. In this illustrative example, the raw meat weighs 4 pounds, the heater assembly is in its vertical position to locate its energized coil 30 in heating relation to the meat; the meat is rotated at 70 r.p.m.; the oven thermostat is set to provide oven temperature of 275° F., and cycled by the low amplitude thermostat to limit temperature variation to ±10° F., and the power wattage is 1700. Performance and test results proved to be similar to the roasting operation previously described with reference to FIG. 1.

In the baking of pies, casseroles, etc., it frequently occurs that the oven heat causes spillovers which, in conventional ovens, contacts the hot oven liner bottom wall resulting in the burning and charring of the foodstuffs to form a dark brown or black coating tenaciously adhering to the oven liner.

In baking by the present apparatus, the electric heater element 28 is energized to heat the oven to the desired baking temperature, and the pies or casseroles in conventional containers are positioned on the usual oven shelves supported on the slide rails 112 or 112a on the oven liner side walls. In the baking process, it has been found that control of temperature variations, in baking by electrical heat energy, are of primary importance as, in energy input fluctuations or power surges, the conventional oven thermostat permits variations in ±30° F. It is this factor that causes bubbling and spillover of pies and casseroles as, for example, a conventional set oven temperature may vary 20° to 30° F. where the input wattage to the heater element fluctuates in a manner to permit large spurts of energy for short periods of time.

To avoid this undesirable condition conducive to spillovers and spatters, it has been determined that such temperature variations may be avoided by the provision of the low amplitude thermostat LAT, which controls the input wattage to the heater element, to permit variations only of ±10° F. While not shown, the pie or casserole may be rotated in the oven to produce uniform browning.

FIG. 16 illustrates a modification of the present invention and in which the pan 50a is stationary and the food-holding grid 76a with its rack 100a supported for rotational movement. More particularly, the pan 50a, drive mechanism 53a and grid 76a and rack 100a are supported by the stationary shelf 68a slidable into and out of the oven liner on the rails 18, 18. The drive mechanism 53a is releasably connected to the drive shaft 55 of the motor pins 57 in slots in the member 58a as previously described, to permit the shelf 68a, with the drive mechanism 53a, pan 50a, meat-holders 76a and 100a, to be removed as a unit from the oven.

Referring to the drive mechanism and its connection to the meat holders 76a and 100a, the coupling member 58a has an upwardly extending shaft secured to a hub 71a by suitable means, such as shown in FIG. 4. The shaft is rotatable on roller bearings provided in an annular support member 66a in a manner similar to that shown in FIG. 4, with the radially extending flange of the member 66a positioned against and welded to the bottom of the cross bars of the shelf 68a. The hub 71a extends through a central opening in pan 50a and is rotatable on the support member 66a and has its upper end mounting the control collar of the grid 76a. The cone 84 may have its base portion 84a coupled to the hub 71a in the manner shown in FIG. 4 and serving to position the grid 76a for rotation relative to the pan. The rack 100 has the adjustment 89 to permit the rack to move vertically on the cone 84 relative to the grid 76a. A pad 83 is positioned on the bottom wall of the pan and serves the same function as previously described in preventing spatter from the meat, such as steaks, positioned on and rotatable with the grid and rack relative to the stationary pan.

FIG. 17 illustrate a modification of the drive mechanism in which the pan 113 is supported on a platform in the form of a dish-shaped plate 114 having an upturned peripheral edge 114a confining the pan to the platform during rotation thereof. Centrally located at the axis of rotation of the pan is a disc 115 secured to the plate and a T-shaped drive member 116, the disc 115 having a hexagonal drive pin 117 downwardly extending into the hub of the drive member for rotation thereby. The drive member 116 has its head portion supported on a heat-resistant washer 18 seated on a radially extending flange 119 of a collar 120 secured to the bottom of the bars of a shelf 121, the shelf being slidably supported on guide rails on the side walls of the oven liner. A bushing 122 is provided between the hub of the drive member 116 and the collar 120.

The pan is rotated by an electric motor 123 secured to the rear wall of the oven and having its drive shaft 124 connected to a coupling member 125 having radially spaced pins 126 engageable with the sides of a bar portion 127 of a second coupling member 128 to provide a releasable connection upon movement of the shelf from the oven.

The pan drive mechanism further comprises a shaft 129 extending between two support brackets 130, 130 and having its ends provided with sockets of square configuration, one socket receiving the corresponding end of the shaft of the coupling member 128 and the other socket receiving a shaft 132. The shaft 132 has a bevel gear 133 meshing with a bevel gear 134 connected to the hub of the drive member 116. It will be apparent that, upon energization of motor 123, a drive train is established for effecting rotation of the pan 113. The coupling 125 and 128 permit the ready connection and separation of the drive motor and the drive mechanism so that the shelf, drive mechanism, and pan can be inserted into and removed from the oven cavity for handling and observation of foods in the cooking operation.

FIG. 18 illustrates another modification of the invention in which a pan 135 is provided having a metal cylindrical side wall terminating in a well 136, the radially inner periphery of the well has an offset radially extending flange 137 providing a seat for a translucent or transparent plate 138 forming the bottom wall of the pan. The plate 138 has a central circular opening defined by the inner peripheral edge portion of the plate, which edge portion is secured to the motor-driven rotatable hub 139 for rotating the pan and its contained food-holders previously described. A conventional electric heater element or coil 140 is positioned beneath the bottom wall 138 of the pan and is energized in the cooking operation.

The transparent plate is formed of a material stable at temperatures approaching the maximum temperature of the heating element 140 and is also capable of transmitting radiant heat. Preferably, the plate is formed of a material having the property of diffusively transmitting a substantial portion of any radiant heat applied to the lower face thereof. In this respect, any translucent refractory material can be utilized to provide the plate 138 and preferably a plate formed of heat shock resistant glass of which several varieties are commercially available, for example, glass sold under the trade name "Vycor."

In the cooking process, the pan is rotated; the electric heater is energized so that the bottom of the food, such as steaks, is broiled with any spatter being in a downward and sidewise direction during rotation of the pan, any excessive grease and water mixture being constantly moved by centrifugal force into the well of the pan. It has been also determined that, even though the heater is maintained at a temperature which would immediately ignite grease spattering thereon, the grease and water mixture spattering upon the top surface of the plate is not burned or smoldered.

What is claimed is:

1. In a food cooking apparatus, a food container having a bottom wall and surrounding side wall; a food supporting grid in said container; a heating element positioned adjacent said grid; means for rotating said grid about a generally vertical axis at a number of controlled speeds; and a porous member positioned between said grid and said container bottom wall, said porous member being formed of a material which permits the fluids exuding from the food product being cooked to pass therethrough, whereby rotation of said grid causes the exuding fluids to be driven from the food product such that they pass through the said porous member before reaching an explosive temperature.

2. In a food cooking apparatus as defined in claim 1 wherein said container bottom wall includes a well, said well being covered by said porous member whereby the fluids which collect in said well after passing through said porous member are protected from further heating.

3. In a food cooking apparatus as defined in claim 2 wherein said means for rotating said grid is operable in a range from 30 to 300 revolutions per minute.

4. In a food cooking apparatus as defined in claim 3 wherein said means for rotating said grid is operatively connected to said container whereby said container rotates with said grid.

5. In a food cooking apparatus as defined in claim 3 wherein said container is rotatably connected to said grid whereby said container remains stationary during rotation of said grid.

6. In a food cooking apparatus as defined in claim 3 wherein said heating element is an electrically energized resistance element positioned above said container.

7. In a food cooking apparatus as defined in claim 3 wherein said container bottom wall comprises a heat resistant glass plate and said heating element is positioned beneath said plate and is adapted to transmit radiant energy through said plate to cook the food.

8. In a food cooking apparatus as defined in claim 6 further including control means for thermostatically regulating the wattage input of said resistance element to prevent heating of the exuding fluids to an explosive temperature.

9. A cooking apparatus comprising an oven having walls defining a cooking compartment; heating means positioned within said compartment; a food container having a bottom wall positioned in said compartment; a food supporting grid in said container; a porous member positioned in said container between said grid and said bottom wall, said porous member being formed of a material permitting fluids to pass therethrough; means for rotating said food supporting grid about a generally vertical axis; means for adjustably controlling the speed of rotation of said grid whereby the fluids exuding from the cooking food may be centrifugally expelled toward the side and bottom of the container; and means controlling the heating means to limit the ambient temperature variations to ±10° F. in the compartment.

10. The cooking apparatus as defined in claim 9 wherein said speed controlling means is operative to control rotation of the grid in a range from 30 to 300 revolutions per minute.

11. The cooking apparatus as defined in claim 10 wherein said heating element is an electrically energized resistance element, and a temperature sensing thermostatic device is provided to control the wattage input to the heating element to prevent heating of the exuding fluids to an explosive temperature.

12. The cooking apparatus as defined in claim 9 wherein said porous member covers the bottom wall of said container and is formed of a material providing a heat barrier to prevent heating of the bottom of the container.

13. The cooking apparatus as defined in claim 12 wherein the container has a surrounding side wall and said bottom wall has a circumferential well adjacent said side wall, and said porous member covers said well.

References Cited

UNITED STATES PATENTS

| | | | |
|---|---|---|---|
| 1,731,743 | 10/1929 | Harrison | 99—421 XR |
| 2,049,481 | 8/1936 | Walterspiel | 99—444 XR |
| 2,181,847 | 11/1939 | Finizio | 99—421 |
| 2,265,421 | 12/1941 | Donnelly | 126—338 XR |
| 2,510,526 | 6/1950 | Smith | 99—331 |
| 2,482,601 | 9/1949 | Spartalis | 99—421 |
| 2,848,592 | 8/1958 | Mergen | 219—404 |
| 2,945,598 | 7/1960 | Rallis | 99—443 XR |
| 3,086,449 | 4/1963 | Cahill | 99—446 |
| 3,204,549 | 9/1965 | Palowsky | 99—443 XR |
| 3,221,638 | 12/1965 | Wickenberg | 99—421 XR |

BILLY J. WILHITE, Primary Examiner

U.S. Cl. X.R.

99—390, 393, 400, 421, 443, 446, 450, 107